United States Patent
Kiehs et al.

[15] 3,681,425

[45] Aug. 1, 1972

[54] 2,6-DINITRA-4-TRIFLUOROMETHYL-ANILINES

[72] Inventors: Karl Kiehs; Karl-Heinz Koenig, both of Ludwigshafen; Adolf Fischer, Mutterstadt, all of Germany

[73] Assignee: Badische Anilin- & Soda-Fabrik Aktiengesellschaft, Ludwigshafen (Rhine), Germany

[22] Filed: Dec. 16, 1968

[21] Appl. No.: 784,247

[30] Foreign Application Priority Data

Dec. 21, 1967 Germany............P 16 43 719.7

[52] U.S. Cl................260/465 E, 260/577, 260/573, 71/105
[51] Int. Cl..............................C07c 121/52
[58] Field of Search.......260/397.6, 465 E, 573, 577, 260/239 B

[56] References Cited

UNITED STATES PATENTS

| | | | |
|---|---|---|---|
| 2,792,296 | 5/1957 | Heininger | 260/465 E |
| 3,287,100 | 11/1966 | Rohr et al. | 260/465 E |
| 1,915,334 | 6/1933 | Salzberg et al. | 260/243 |
| 3,227,734 | 1/1966 | Soloway et al. | 260/397.6 |
| 3,257,190 | 6/1966 | Soper | 260/577 |
| 3,442,639 | 5/1969 | Soper | 260/577 |
| 3,466,329 | 9/1969 | Soper | 260/577 |

*Primary Examiner*—Henry R. Jiles
*Assistant Examiner*—S. D. Winters
*Attorney*—Marzall, Johnston, Cook & Root

[57] ABSTRACT

New and valuable substituted dinitroanilines and a process for controlling the growth of unwanted plants with these compounds.

1 Claim, No Drawings

2,6,-DINITRA-4-TRIFLUOROMETHYL-ANILINES

The present invention relates to new and valuable substituted dinitroanilines and a process for controlling the growth of unwanted plants with these compounds.

It is known to use N,N-dipropyl-4-trifluoromethyl-2,6-dinitroaniline for controlling the growth of unwanted plants, especially in cotton.

An object of the invention is new and valuable substituted dinitroanilines. More particularly an object of the invention is new and valuable 2,6-dinitroanilines. Yet another object of the invention is a process for controlling the growth of unwanted plants without damaging crop plants.

These and other objects of the invention are achieved by substituted dinitroanilines having the formula

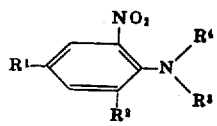

in which one of the radicals $R^2$ denotes a nitro group and the $R^1$ denotes a, trifluoromethyl radical, $R^3$ and $R^4$ are identical or different and each denotes a lower alkyl radical bearing, preferably terminally, at least one halogen, cyano, hydroxy or alkoxy radical as a substituent, one of the radicals $R^3$ and $R^4$ may also be an alkenyl radical when the other of these radicals is a lower alkyl radical bearing substituents as stated above. These substituted dinitroanilines have good herbicidal action and, when compared with active ingredients of similar constitution, have superior plant compatibility.

The new compounds may be applied as herbicides as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosine or diesel oil, coal tar oils and oils of vegetable or animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents, e.g. a polyethylene oxide adduct. Concentrates which are suitable for dilution with water may be prepared from active ingredient, emulsifying or dispersing agent and possibly solvent.

Dusts may be prepared by mixing or grinding the active ingredients with a solid carrier, e.g. diatomaceous earth or fertilizers.

The new compound may be prepared for example by reaction of substituted dinitrochlorobenzenes with substituted amines. They are crystalline or non-distillable oils.

The following examples illustrate the preparation of specific compounds according to this invention.

EXAMPLE 1

Preparation of N-hydroxyethyl-N-allyl-2,6-dinitro-4-trifluoromethylaniline 10.1 parts by weight of N-alkyl-N-hydroxyethylamine is added to a solution of 13.5 parts by weight of 2,6-dinitro-4-trifluoromethylchlorobenzene in 50 parts by weight of dry tetrahydrofuran and the whole boiled under reflux for one to two hours. The solvent is then distilled off, the residue treated with ethyl acetate/water, and the organic phase is removed and dried over sodium sulfate. After the ethyl acetate has been distilled off, the product is obtained as a red-brown oil (93 percent of the theory).

Analysis:

|  | C | H | N |
|---|---|---|---|
| calc.: | 43.0 | 3.6 | 12.5 |
| found: | 43.2 | 3.6 | 12.0 |

EXAMPLE 2

Preparation of N-chloroethyl-N-allyl-2,6-dinitro-4-trifluoromethylaniline 16.7 parts by weight of N-hydroxyethyl-N-allyl-2,6-dinitro-4-trifluoromethylaniline is dissolved in 50 parts by weight of benzene. After adding 1 part by weight of dimethylformamide and dripping in 30 parts by weight of thionyl chloride at room temperature the whole is boiled for 2 hours under reflux. The volatile constituents are distilled off from the reaction mixture at 20 mmHg, the residue is taken up in ethyl acetate, the solution is washed with ice-water, then with 10 percent sodium bicarbonate solution and finally again with water and the organic phase is dried over sodium sulfate.

After distilling off the solvent a dark brown oil (95 percent of the theory) is obtained from which, after purifying over silica gel (benzene), yellow crystals may be isolated which have a melting point of 39° to 41° C.

Analysis:

|  | C | H | N | Cl |
|---|---|---|---|---|
| calc.: | 40.7 | 3.1 | 11.9 | 10.0 |
| found: | 40.4 | 3.2 | 11.6 | 9.9 |

Examples of substances prepared in the same way are:

N-chloroethyl-N-cyanoethyl-4-trifluormethyl-2,6-dinitroaniline m.p. 66° to 67° C N,N-bis-chloroethyl-2,6-dinitro-p-toluidine m.p. 66° to 67° C N-propyl-N-cyanoethyl-2,4-dinitro-6-trifluoromethylaniline m.p. 56° C N-allyl-N-cyanomethyl-2,4-dinitro-6-trifluoromethylaniline m.p. 56° C N-methoxyethyl-N-cyanoethyl-4-trifluoromethyl-2,6-dinitroaniline m.p. 67° to 68° C N-n-butyl-N-cyanoethyl-4-trifluoromethyl-2,6-dinitroaniline m.p. 93° C.

The following comparative experiment demonstrates the superiority of the compositions according to this invention over known active ingredients.

EXAMPLE 3

In a greenhouse, loamy sandy soil is filled into pots and then sown with the seeds of cotton (Gossypium sp.), Indian corn (Zea mays), soya beans (Glycine hispida), annual meadow grass (Poa annua), orchard grass (Dactylis glomerata), slender foxtail (Alopecurus myosuroides) and barnyard grass (Panicum crus-galli). The soil prepared in this manner is treated with 3 kg per hectare of N-allyl-N-β-chloroethyl-4-trifluoromethyl-2,6-dinitroaniline (I), with 3 kg per hectare of N-propyl-N-propargyl-4-(methylsulfonyl)-2,6-dinitroaniline (II) and, for comparison, with 3 kg per hectare of N,N-dipropyl-4-trifluoromethyl-2,6-dinitroaniline (III), these amounts of the active ingredients each being dispersed in 500 liters of water per hectare. After 4 weeks it is ascertained that compounds I and II, while having the same good herbicidal action as compound III, have superior compatibility with Indian corn and soya beans.

The results of the experiment may be seen from the following table:

|  | Active ingredient | | |
|---|---|---|---|
|  | I | II | III |
| Crop plants: | | | |
| cotton | 0–10 | 0–10 | 0–10 |
| Indian corn | 10–20 | 10 | 30–40 |
| soya beans | 10 | 0–10 | 30 |
| Unwanted plants: | | | |
| annual meadow grass | 100 | 80–90 | 100 |
| orchard grass | 100 | 80–90 | 100 |
| slender foxtail | 90–100 | 80–90 | 90–100 |
| barnyard grass | 90–100 | 80 | 90–100 |

0 = no damage
100 = total destruction

The following substances exhibit the same biological action as I and II:

N-methyl-N-chloroethyl-4-trifluoromethyl-2,6-dinitroaniline
N,N-bis-chloroethyl-4-trifluoromethyl-2,6-dinitroaniline
N-chloroethyl-N-cyanoethyl-4-trifluoromethyl-2,6-dinitroaniline
N-chloroethyl-N-(γ-chloropropyl)-4-trifluoromethyl-2,6-dinitroaniline
N-propyl-N-cyanoethyl-4-trifluoromethyl-2,6-dinitroaniline
N-allyl-N-cyanoethyl-4-trifluoromethyl-2,6-dinitroaniline
N-ethyl-N-cyanoethyl-4-trifluoromethyl-2,6-dinitroaniline
N,N-bis-cyanoethyl-4-trifluoromethyl-2,6-dinitroaniline
N-propyl-N-cyanomethyl-4-trifluoromethyl-2,6-dinitroaniline
N-allyl-N-cyanomethyl-4-trifluoromethyl-2,6-dinitroaniline
N-methoxyethyl-N-cyanomethyl-4-trifluoromethyl-2,6-dinitroaniline
N-propyl-N-chloroethyl-2,4-dinitro-6-trifluoromethylaniline
N,N-bis-chloroethyl-2,4-dinitro-6-trifluoromethylaniline
N-propyl-N-cyanoethyl-2,4-dinitro-6-trifluoromethylaniline
N-allyl-N-cyanoethyl-2,4-dinitro-6-trifluoromethylaniline
N-propyl-N-cyanomethyl-2,4-dinitro-6-trifluoromethylaniline
N-propyl-N-β-chloroethyl-4-trifluoromethyl-2,6-dinitroaniline
N-isopropyl-N-(γ-chloropropyl)-4-trifluoromethyl-2,6-dinitroaniline

We claim:
1. A compound having the formula

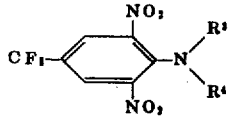

wherein $R^3$ denotes lower cyanoalkyl and $R^4$ denotes allyl, cyanoethyl, chloroethyl, ethyl, propyl, butyl or methoxyethyl.

* * * * *